United States Patent Office 3,770,833
Patented Nov. 6, 1973

3,770,833
METHOD FOR PRODUCING 3,5-DIALKOXY-PHENOLS
Henry Bader and Edwin G. Jahngen, Jr., Newton Center, Mass., assignors to Polaroid Corporation, Cambridge, Mass.
No Drawing. Filed Mar. 30, 1970, Ser. No. 24,005
Int. Cl. C07c 43/22; G03c 5/54
U.S. Cl. 260—613 D   15 Claims

ABSTRACT OF THE DISCLOSURE

An improved process for producing 3,5-dialkoxy-phenols useful as intermediates in the synthesis of metal complexed azomethine dyes. Essentially, the process involves heating a mixture of phloroglucinol (1,3,5-benzenetriol) and an alcohol having from 1–8 carbon atoms in the presence of an azeotropic medium and an acid catalyst.

BACKGROUND OF THE INVENTION (Part 1) The field of the invention

This invention relates to metal complexed dyes useful, for example, in photographic processes. More precisely, the invention disclosed herein relates to an improved method for producing 3,5-dialkoxy phenols useful as intermediates in the synthesis of metal complexed azomethine dyes.

(Part 2) Description of the prior art

The commonly assigned copending application of Elbert M. Idelson, Ser. No. 830,499, filed June 4, 1969, now U.S. Pat. No. 3,597,200, relates to novel 1:1 chrome-complexed azomethine dye developers and to their use in photographic products, processes and compositions such as are described and claimed in U.S. Pat. No. 2,983,606, issued to Howard G. Rogers.

The novel dye complexes of the aforesaid application Ser. No. 830,499 may be defined as chrome-complexed azomethine dyes of the formula:

(A) 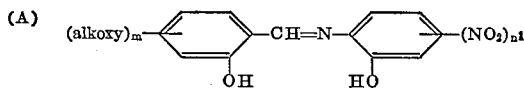

wherein the alkoxy moiety contains 1–8 carbon atoms, e.g., methoxy, ethoxy, propoxy, isopropoxy, butoxy, isobutoxy pentoxy, 3-methyl-butoxy, hexoxy and octoxy; and $n^1$ and $m$ each are positive integers from 1 to 2; the complexed dyes further being characterized as having bonded to the chromium complexing atom by two coordinating atoms a substantially colorless ligand containing a p-dihydroxyphenyl substituent. Preferably, $m$ is 2; the alkoxy moiety has less than six carbon atoms, the two alkoxy substituents being in the 2- and 4-positions; $n^1$ is 1; and the nitro group is in the 3-position.

Ligands containing a p-dihydroxyphenyl silver halide developing substituent (so-called "developer-ligands") are disclosed in the copending application of Elbert M. Idelson, Ser. No. 487,054, filed Aug. 13, 1965, now abandoned.

A preferred class of developer-ligands disclosed in this last-mentioned copending application are those within one of the following formulae:

(B) 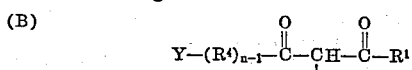

(C) 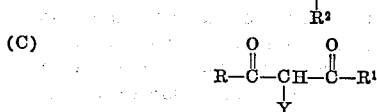

(D) 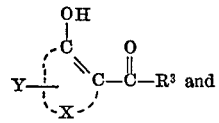

(E) 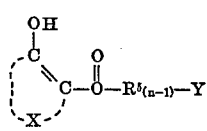

wherein R and $R^1$ are alkyl, alkoxyalkyl, fluoroalkyl, alkylamino, phenyl or a phenylamino radical; $R^2$ may be hydrogen, alkyl or a phenyl radical; $R^3$ may be alkyl, hydroxy or hydrogen; $R^4$ may be alkylene, phenylene or a phenylamino radical; $R^5$ is alkylene; Y is a radical comprising a p-dihydroxyphenyl silver halide developing substituent; X represents the atoms necessary to complete a 5- or a 6-membered aliphatic ring or a benzene ring; and $n$ is a positive integer from 1 to 2. The alkyl moieties of the above-mentioned substituents preferably contain 1–4 carbon atoms.

The novel chrome-complexed azomethine dyes of the invention of U.S. patent application Ser. No. 830,499 and derived from the non-complexed dyes of Formula A and containing a developer-ligand of the foregoing description, may be represented as being within one of the following formulae:

(F) 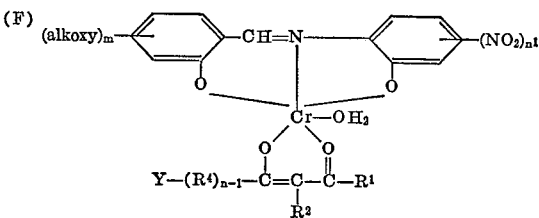

(G) 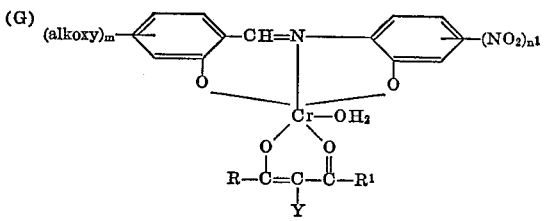

(H) 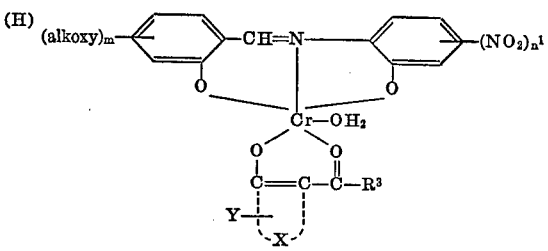

and (I) 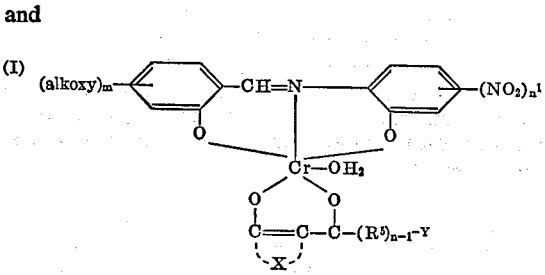

The preferred 1:1 chrome-complexed dyes of the invention of U.S. Pat. application Ser. No. 830,499 are those of the formula:

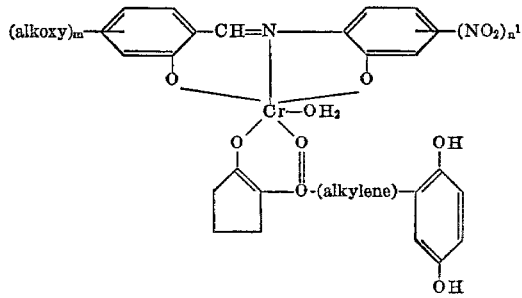

wherein the alkoxy moiety, m and n are as heretofore noted, and the alkylene moiety contains 1–4 carbon atoms, i.e., methylene, ethylene, propylene, isopropylene, butylene or isobutylene.

As examples of useful dyes which may be employed in preparing these novel complexes, i.e., azomethine dyes within the scope of Formula A, mention may be made of the following:

(1) – (10): [chemical structures of azomethine dyes with varying alkoxy substituents: OCH₃, OC₂H₅, OCH(CH₃)₂, OC₃H₇-n, OC₄H₉-n, OC₅H₁₁-n, OCH₂CH(CH₃)₂]

(11) – (13): [additional azomethine dye structures with OCH₂CH₂CH(CH₃)₂, OC₆H₁₃, OC₈H₁₇ substituents]

As examples of useful complexed dyes within the scope of the invention of U.S. patent application Ser. No. 830,499, mention may be made of the following:

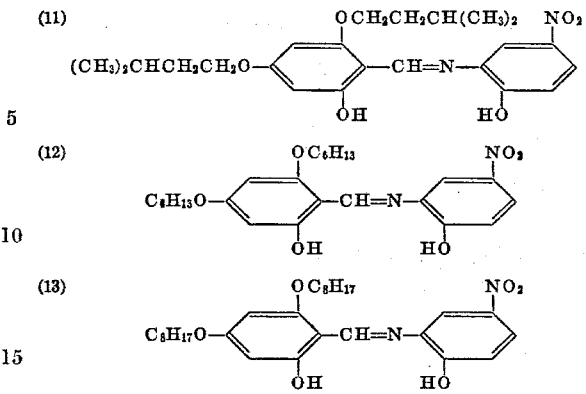

(14) – (17): [chrome-complexed dye structures]

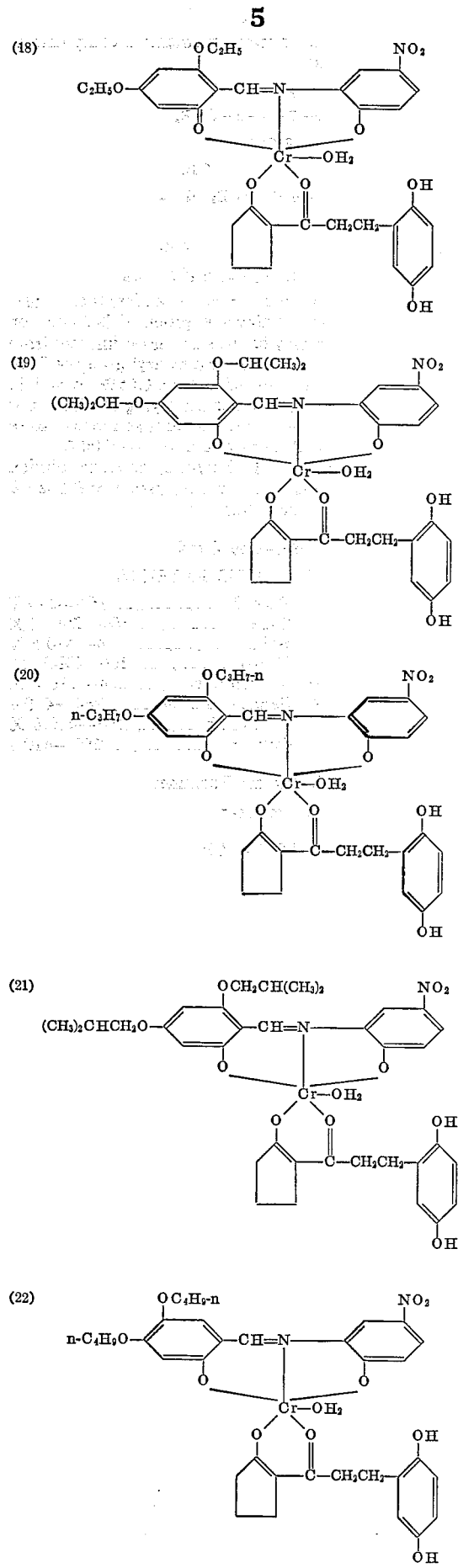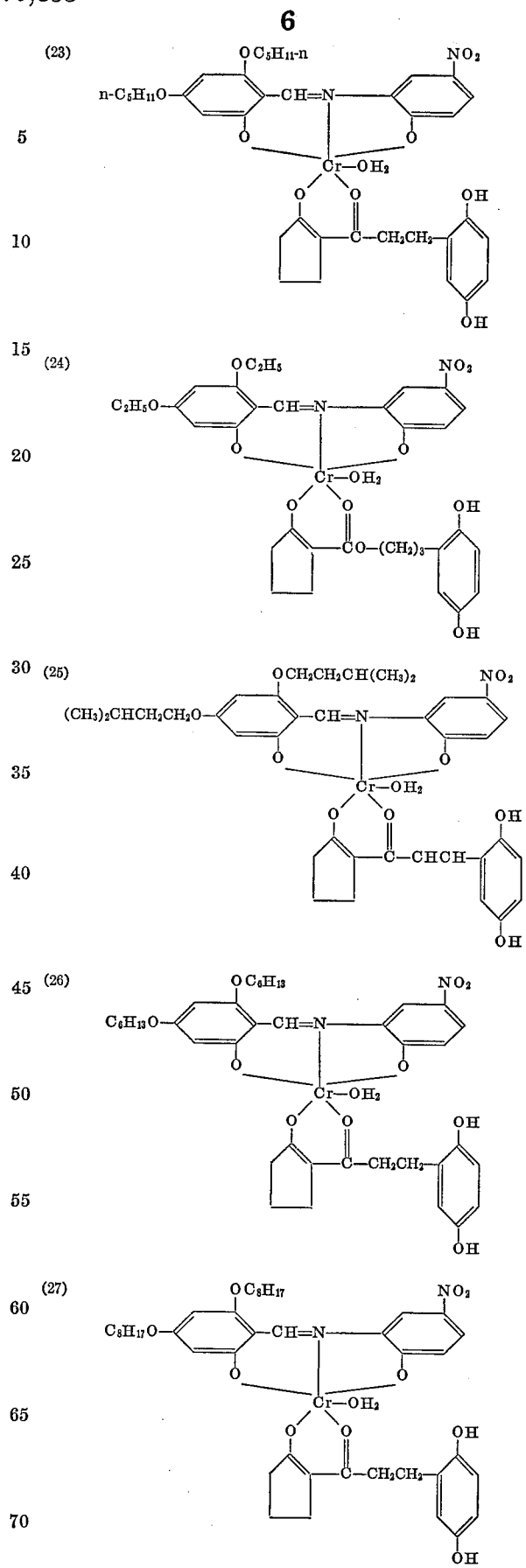
While the present invention contemplates azomethines wherein the designated alkoxy moiety may contain as many as eight carbon atoms, it has been found that where it contains more than five carbon atoms, the complexed dye developers of this invention do not transfer as readily and hence are not as desirable for use in the photographic systems described in the aforementioned U.S. Pat. No. 2,983,606. Hence in the preferred complexes of Formulae F–J, the alkoxy moiety contains 1–5 carbon atoms.

Azomethine dyes useful in the preparation of metal complexes of the invention of U.S. patent application Ser. No. 830,499 may be obtained by the following reaction:

atoms. The following table, for example, illustrates the yields and reaction times involved in the preparation of various dialkoxyphenols by methods presently known to the art. The table below is contained in the article entitled, "Ethers of Phloroglucinols," by Joseph C. Touchstone, James Ashmore and Max N. Huffman, JACS 78, 5643 (1956) and said article is incorporated herein by reference.

TABLE I.—DIETHERS OF PHLOROGLUCINOL

| Name | Reaction time, days | Crude yield, percent | M.p. or B.P., °C. | Formula | Calculated | | Analyses, percent | |
|---|---|---|---|---|---|---|---|---|
| | | | | | Carbon | Hydrogen | Carbon | Hydrogen |
| Dipropyl | 4 | 57 | {47.5–48 / 92–95 (10μ)} | $C_{12}H_{18}O_3$ | 68.54 | 8.63 | 68.64  68.57 | 8.55  8.59 |
| Dibutyl | 2 | 50 | {39–40 / 169–165 (100μ)} | $C_{14}H_{22}O_3$ | 70.54 | 9.31 | 70.56  70.40 | 9.31  9.37 |
| Diamyl | 7 | 20 | 100 (5–6μ) | $C_{16}H_{26}O_3$ | 72.14 | 9.84 | 72.06  71.98 | 9.45  9.53 |
| Dihexyl | 7 | 26 | 115 (6–7μ) | $C_{18}H_{30}O_3$ | 73.43 | 10.27 | 73.48  73.43 | 10.25 | 10.34 |
| Diheptyl | 7 | 16 | {49–50 / 125–129 (7–8μ)} | $C_{20}H_{34}O_3$ | 74.48 | 10.63 | 74.50  74.63 | 10.56 | 10.63 |
| Dioctyl | 3 |  | 47–47.5 | $C_{22}H_{38}O_3$ | 75.36 | 10.95 | 75.34  75.45 | 11.00 | 10.93 |

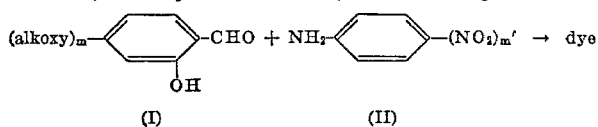

(I)  (II)

In turn, a preferred reactant I is a compound of the following formula:

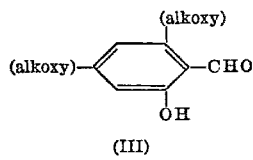

(III)

wherein the alkoxy radicals comprise 1–8 carbon atoms and preferably 2–5 carbon atoms.

Compounds of Formula III can be conveniently prepared by reacting dialkoxyphenols of the following type:

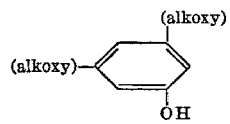

with Vilsmeier regent, e.g., dimethylformamide-phosphoryl chloride (or phosgene) as follows:

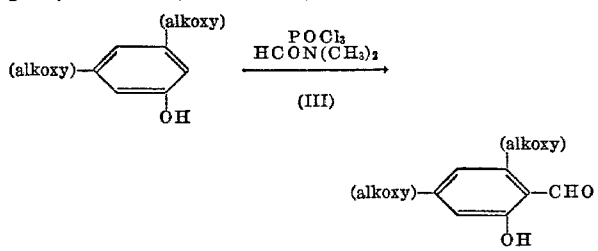

Methods for preparing the dialkoxyphenols employed in the preparation of compounds of Formula III are known. In general, the preparation involves the reaction of phloroglucinol with the appropriate alcohol in the presence of sulfuric or hydrochloric acid. It is also known in the art that the yields and reaction rates involved in the preparation of the above-mentioned dialkoxyphenols except in the case of dimethoxyphenols are extremely poor. The dimethoxyphenols can be produced at high yelds and satisfactory rates by methods known to the art as well as the method described herein. Accordingly, although the process of the present invention can be employed to produce dimethoxyphenols, it is especially advantageous when employed to produce dialkoxyphenols wherein the alkoxy group contains 2 or more carbon

SUMMARY OF THE INVENTION

In accordance with the practice of the present invention, an improved process for producing high yields of dialkoxyphenols at substantially increased rates is presented to the art. In some instances, the process of the present invention can be employed to produce dialkoxyphenols in yields greater than 80% in less than a day.

The process of the present invention essentially involves refluxing phloroglucinol with the appropriate alcohol in the presence of an azeotropic media and particular strong acids.

The alcohols employed in the process of the present invention include those mentioned before having from 1–8 carbon atoms, e.g., methanol, ethanol, propanol, isopropanol, butanol, isobutanol, pentanol, isopentanol, heptanol, octanol and the like.

Any solvent which is inert to the acid(s) employed and which can form a binary or tertiary azeotrope with water or water and alcohol can be employed to provide a suitable azeotropic media. Specific suitable solvents are benzene, toluene, and cyclohexane.

The particular acids employed in the practice of the present invention are strong acids as defined by the Hammett acidity function $H_0$. Details relating to the Hammett acidity function can be found in "$H_0$ and Related Indicator Acidity Functions," by M. A. Paul and F. A. Long, Chem. Rev., vol. 57, pages 1–45. Essentially, the acids employed in the practice of the present invention are those having a negative Hammett acidity function $H_0$ value as measured in a five molar aqueous solution. More precisely, the preferred acids are those having a negative Hammett acidity function $H_0$ value as measured in a five molar aqueous solution and which will not interact with phloroglucinol to provide any appreciable amount of species thereof which can undergo further reaction to form diphenyl ethers. Especially preferred are the stronger inorganic acids which are substantially non-volatile at the reaction temperatures involved. Such acids include perchloric acid, fluorboric acid, fluosulfonic acid and hexafluorophosphonic acid. Suitable results are obtained when the aforementioned acids are employed in concentrations between about 10 to about 30 mole percent based on the amount of phloroglucinol involved.

Another class of acids that can be employed in combination with the azeotropic media in the practice of the present invention are the organo-sulfonic acids. Specific organo-sulfonic acids include methane-sulfonic acid, benzenesulfonic acid, p-toluene-sulfonic acid and m-benzenedisulfonic acid. In accordance with the preferred practice of this aspect of the present invention, the organo-sulfonic acids are employed at higher concentrations, e.g., in amounts above about 30 mole percent based on the amount of phloroglucinol involved.

DESCRIPTION OF THE PREFERRED EMBODIMENTS

The preferred embodiments of the present invention and the practice of the invention will be better understood by reference to the following illustrative examples.

EXAMPLE 1

Preparation of 3,5-di-n-propoxyphenol

A mixture of 25.2 g. (0.2 mole) of anhydrous phloroglucinol (the hydrate may also be suitably employed), 100 ml. of n-propanol, 20.8 g. (14.9 ml.; 0.04 mole) of 48–50% fluoboric acid (J. T. Baker Chemical Company) and 150 ml. of benzene [1] was refluxed with stirring under an atmosphere of nitrogen, while the water formed in the reaction was separated in a Dean-Stark trap. After a period of 19 hours, 21 ml. of water [2] were removed. The solution was cooled, and washed successively with 200 ml. of water, with three portions (200 ml. each) of a saturated aqueous solution of sodium bicarbonate, and finally with 200 ml. of water. The organic phase was separated, dried over anhydrous magnesium sulfate and freed of solvent on a rotor-evaporator at 100° for 2½ hours [3] to give 40.5 g. of a red oil, containing 89.7% of 3,5-di-n-propoxyphenol by a V.P.C. analysis which indicates a yield of 87.5% of the theoretical yield.

EXAMPLE 2

Preparation of 3,5-di-n-propoxyphenol

Substantially the same procedure as in Example 1 was followed, but 3.47 g. of 70% solution of perchloric acid (0.04 mole) was substituted for the fluoboric acid of Example 1. The yield of 3,5-di-n-propoxyphenol was 83%.

EXAMPLE 3

Preparation of 3,5-diethoxyphenol

Substantially the same procedure of Example 2 was followed, but 100 ml. of ethanol was substituted for 100 ml. of propanol. The yield of the 3,5-diethoxyphenol, M.P.: 85–86° C., was 74.9%.

EXAMPLE 4

Preparation of 3,5-di-n-hexoxyphenol

Substantially the same procedure of Example 2 was followed, but 100 ml. of n-hexanol was substituted for 100 ml. of propanol. The yield of 3,5-n-dihexoxyphenol was 41%.

EXAMPLE 5

Preparation of 3,5-diamyloxyphenol

Substantially the same procedure of Example 2 was followed, but 100 ml. of n-amyl alcohol was substituted for propanol. The yield of 3,5-n-diamyloxyphenol, B.P. 155° C. at 0.16 mm./Hg, was 55.5%.

EXAMPLE 6

Preparation of 3,5-di-n-propoxyphenol

A mixture of 32.4 g. (0.2 mole) of hydrated phloroglucinol, 100 ml. of n-propanol, 9.53 g. (0.04 mole) of m-benzenedisulfonic acid, and 150 ml. of benzene, was heated under reflux with stirring, while water formed in the reaction was separated in a Dean-Stark trap. After a period of 72 hours, the reaction was cooled, and washed successively with 200 ml. of water, with three portions, 200 ml. each of a saturated aqueous solution of sodium bicarbonate, and finally with 200 ml. of water. The organic phase was separated, dried over anhydrous magnesium sulfate, and freed of solvent on a rotor evaporator

---

[1] Preferably, benzene is added last, after the phloroglucinol is dissolved.
[2] The reaction itself requires removal of 7.5 ml. of water; the rest of the water comes from fluoboric acid and from a partial dehydration of the alcohol.
[3] This rigorous removal of solvent was needed only for analytical purposes and can be omitted in a routine procedure.

at 100° C. for 2½ hours, to give 38.1 g. of a red oil containing 78% of 3,5-di-n-propoxyphenol by V.P.C. analysis which indicated a yield of 71.0% of theoretical yield.

EXAMPLE 7

Preparation of 3,5-di-n-propoxyphenol

Substantially the same procedure as in Example 6 was followed, but 23.8 g. (0.1 mole) of m-benzenedisulfonic acid was used instead of 9.53 g. (0.04 mole); the yield of 3,5-di-n-propoxyphenol was 83.1%.

EXAMPLE 8

Preparation of 3,5-di-n-propoxyphenol

A mixture of 32.8 gms. (0.2 mole) of phloroglucinol dihydrate, 19.2 gms. (0.1 mole) of p-toluenesulfonic acid, 100 ml. of n-propanol and 150 ml. of benzene was heated under reflux with stirring, while the water formed in the reaction was separated in a Dean-Stark trap. After a period of 72 hours 2.7 ml. of water was removed. The solution was cooled, washed with 200 ml. of water, then with three portions of 200 ml. each of saturated sodium bicarbonate solution and freed of solvent under vacuum. The residual oil (32.6 gms.) was analyzed by V.P.C. and shown to contain 80.5% of 3,5-di-n-propoxyphenol, which corresponds to an overall yield of 62.4%.

Distillation gave a colorless oil, B.P. 128°–132°/0.015 mm., $$\lambda^{EtOH}_{max.}$$

267 mμ, ϵ=574, pure 100% by V.P.C. Analysis: Found (percent): C, 68.23; H, 8.54. Calculated for $C_{12}H_{18}O_3$ (percent): 68.62 H, 8.63.

As can be appreciated from a comparison of the above examples and Table I, the process of the present invention provides markedly higher yields of dialkoxyphenols at accelerated reaction rates. For example, according to the processes of the prior art (Table I), a crude yield of 57% dipropoxyphenol is obtained after 4 days. In contrast thereto, Examples 1 and 2 and 6 and 7 illustrate that the process of the present invention can provide markedly improved yields of dipropoxyphenol. For example, in Examples 1 and 2, yields in excess of 80% were obtained in less than a day. Also, a comparison of Examples 4 and 5 and Table I illustrates the improved results obtained when the practice of the present invention is applied to the production of the higher alcohols. Improved results can also be obtained when other alchols, acids and azeotropic media mentioned before are substituted for those employed in the above examples offered for the purposes of illustrating the invention.

Since certain changes may be made in the above process without departing from the scope of the invention herein involved, it is intended that all matter contained in the above description shall be interpreted as illustrative and not in a limiting sense.

What is claimed is:

1. A process for producing 3,5-dialkoxyphenols which comprises the steps of heating a mixture of 1,3,5-benzenetriol and an alkanol having from 1–8 carbon atoms in the presence of an azeotropic medium chosen from the group consisting of benzene, toluene, cyclohexane and mixtures of these and an acid selected from the group consisting of perchloric acid, fluoboric acid, fluosulfonic acid, hexafluorophosphonic acid, benzenedisulfonic acid, p-toluenesulfonic acid, methane sulfonic acid, m-benzenedisulfonic acid and mixtures of these and removing water formed during said heating.

2. A process for producing 3,5 di n-propoxyphenol which comprises the steps of heating 1,3,5-benzenetriol and n-propyl alcohol in the presence of an azeotropic medium chosen from the group consisting of benzene, toluene, cyclohexane and mixtures of these and an acid selected from the group consisting of perchloric acid, fluoboric acid, fluosulfonic acid, hexafluorophosphonic acid, benzenedisulfonic acid, p-toluenesulfonic acid, methane sulfonic acid, m-benzenedisulfonic acid and mixtures of these and removing water formed during said heating.

3. A process of claim 1 wherein said alkanol comprises from 2–8 carbon atoms.

4. A process of claim 1 wherein said alkanol comprises 3 carbon atoms.

5. A process of claim 1 wherein said azeotropic medium is benzene.

6. A process of claim 1 wherein said azeotropic medium is toluene.

7. A process of claim 1 wherein said azeotropic medium is cyclohexane.

8. A process of claim 1 wherein said acid is perchloric acid.

9. A process of claim 1 wherein said acid is fluoboric acid.

10. A process of claim 1 wherein said acid is fluosulfonic acid.

11. A process of claim 1 wherein said acid is hexafluorophosphonic acid.

12. A process of claim 1 wherein said acid is benzenedisulfonic acid.

13. A process of claim 1 wherein said acid is p-toluenesulfonic acid.

14. A process of claim 1 wherein said alkanol is n-propylalcohol, said azeotropic medium is benzene and said acid is perchloric acid.

15. A process of claim 1 wherein said alkanol is n-propylalcohol, said azeotropic medium is benzene and said acid is fluoboric acid.

References Cited

UNITED STATES PATENTS

| | | | |
|---|---|---|---|
| 3,107,265 | 10/1963 | Butts et al. | 260—613 D |
| 2,486,926 | 11/1949 | Carroll et al. | 260—613 D |
| 2,593,563 | 4/1952 | Huffman | 260—613 D |

FOREIGN PATENTS

| | | | |
|---|---|---|---|
| 4,421,863 | 1969 | Japan | 260—613 D |
| 1,225,655 | 9/1966 | Germany | 260—613 D |

OTHER REFERENCES

Horsley, "Azeotropic Data," (1952), p. 10.

BERNARD HELFIN, Primary Examiner

J. E. EVANS, Assistant Examiner

U.S. Cl. X.R.

260—430, 438.5 R, 566 R, 600